L. Hull,
Working Rattan.
Nº 28,488.      Patented May 29, 1860.
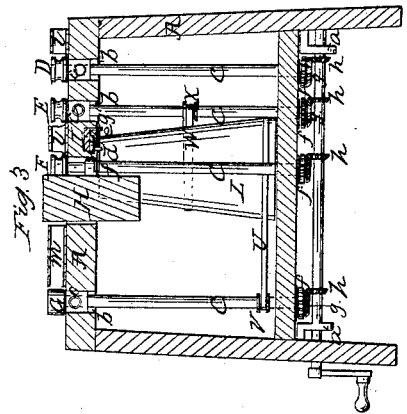
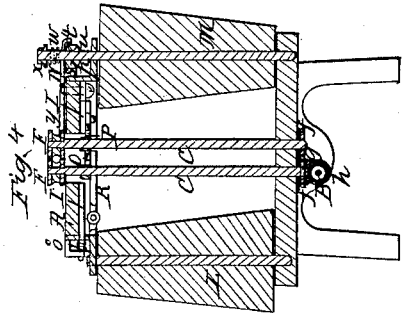
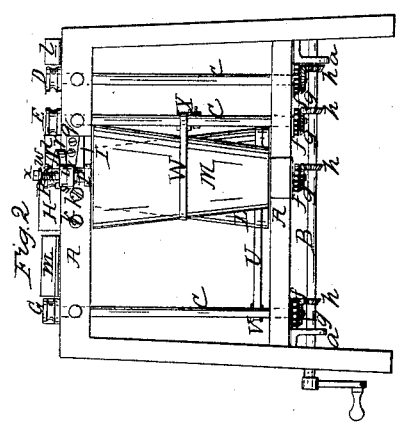
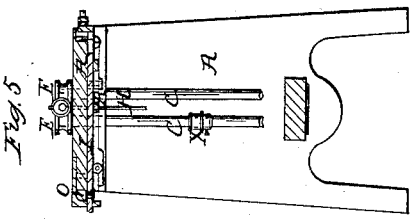
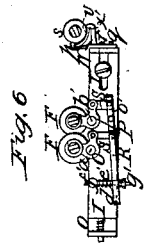
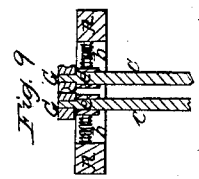
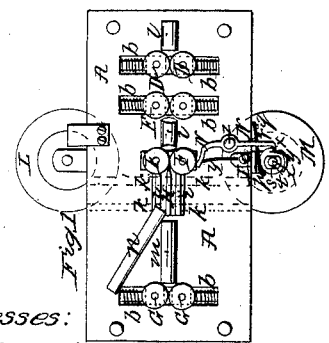
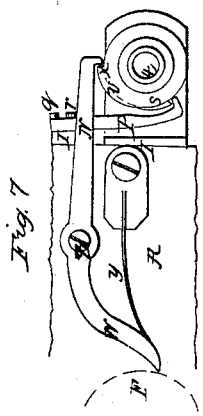
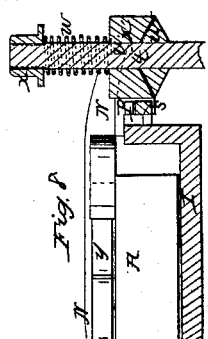
Witnesses:
Inventor:
Linus Hull

UNITED STATES PATENT OFFICE.

LIVERAS HULL, OF CHARLESTOWN, MASSACHUSETTS.

RATAN-MACHINE.

Specification of Letters Patent No. 28,488, dated May 29, 1860.

*To all whom it may concern:*

Be it known that I, LIVERAS HULL, of Charlestown, in the county of Middlesex and State of Massachusetts, have invented a new and useful Machine for Splitting Ratan; and I do hereby declare that the same is fully described and represented in the following specification and the accompanying drawings, of which—

Figure 1 is a top view of the said machine; Fig. 2, a side elevation of it; Fig. 3, a vertical and longitudinal section of it; Fig. 4, a vertical and transverse section taken through its cone drums; Fig. 5, a vertical and transverse section through the slider of its lateral motion mechanism; Fig. 6, an underside view of the said slider and the machinery applied thereto for connecting it with the knife edge feed rollers; Fig. 7, a top view (on an enlarged scale) of the actuator cam, and its holding cam to be hereinafter described; Fig. 8, an enlarged sectional view of the said cams and their shaft and friction mechanism.

The object of the said machine is to split sticks of ratan diagonally for use in the manufacture of whipstocks. Hitherto it has been customary either to split them by hand labor or to saw them by means of a machine for which a patent was granted to me, July 31st, 1855. As the sawing process was necessarily attended with a considerable waste of stock and other disadvantages, I have devised machinery for splitting the ratan in manner as stated.

The nature of my invention consists in combining with a splitting knife and a feeding mechanism machinery for moving the feed rollers next the knife edge laterally relatively to such edge substantially as hereinafter described and for the purpose of causing a stick of ratan, while being split lengthwise, to be cut diagonally from end to end. Also, in combining therewith, a mechanism not only for arresting the operations of the lateral motion machinery immediately after the stick may have been split, but for holding the actuating cam in its proper position for the machinery to commence its action on another ratan. Also, in a mode of applying the actuator and its stopping cam to their shaft and combining therewith, a means of producing and regulating the friction of the cams on the cam supporter of the shaft. Also, in combining with the slider of the lateral motion mechanism, an arm and adjusting devices arranged to operate substantially in manner and for the purpose as hereinafter specified. Also, in a combination of mechanism by which the shafts of one pair of the feed rollers are connected with the slider and have a spring pressure applied to them. Also, in an arrangement of guides relatively to the knife and the foremost draft rollers.

In the drawings, A, exhibits the frame or table of the machine, the same having a driving shaft B, disposed within it and supported by hangers, $a$, $a$, such shaft being arranged underneath the vertical shafts, C, C, C, C, of four sets of feeding rollers, D, D; E, E; F, F, and G, G. The feeding rollers are arranged in pairs and above the table as shown in Figs. 1, and 2. The upper boxes of all except the rollers, F, F, are arranged to slide freely in lateral guide grooves $b$, $b$ the said boxes being represented at $c$, $c$, in Fig. 9, which is a vertical section of one of the grooves $b$, and a pair of the feed rollers. Each box, $c$, rests against one of two springs placed within the groove and operating in such manner as to force the two rollers toward one another. The shafts, C, C, of each set of feed rollers are connected, at their lower ends, by a pair of spur gears, $f$, $f$. One of the shafts of each pair of shafts is furnished with a bevel gear, $g$, which engages with one of a series of bevel gears $h$, $h$, carried by the shaft B, as shown in the drawings.

Directly in advance of the two feeding rollers E, E, a knife H, is arranged, the same being held vertically between two clamping jaws or plates, $i$, $i$, which are forced toward one another and are adjusted in position by means of four screws $k$, $k$, $k$, $k$, applied transversely within the frame, A, as shown in Fig. 2, and by dotted lines in Fig. 1. The said knife extends both above and below the top board of the table, and is made of considerably greater length than is necessary for splitting a ratan, the same being to enable the knife to be raised upward in such manner as to present a fresh portion or another portion of its cutting edge directly on a level with the feed rollers after a part of the edge may have become dulled by use.

Tubular guides $l$, $l$, $m$, are arranged as shown in Figs. 1, and 3. In connection with the knife and the guide, $m$, in advance of the knife, I employ another guide, n, arranged relatively to the knife as shown in Figs. 1, and 2, the same being to deflect and discharge one of the strips of ratan, while the other passes through the tubular guide, m, and is drawn forward by the rollers, G, G, one of which is cylindrical while the other is grooved in and around its periphery. Each of the other feed rollers has a grooved periphery. The deflector or guide, n, prevents one of the strips from passing into the guide, m, with the other strip.

A slider or sliding plate, I, is arranged transversely underneath the table top and has one end resting against a spring, o; its opposite end is curved and carries an adjustable arm, p, which is secured to such end by two screws, q, r, (see Fig. 1). One extremity of the arm is hooked and bears against an actuator or cam, s, carried by a cone, u, fixed on a vertical shaft, t, which is driven by one of the cone drums, L, M, arranged as shown in the drawings. The actuator is formed with a conical hole or recess through its middle corresponding to and to rest upon the cone, u. Furthermore, there is attached to the actuator, another cam, v, exactly like it, but arranged over it and in other respects relatively to it as shown in the drawings. On the top surface of this latter cam, a helical spring w, rests it being made to envelop the shaft, t, on whose upper part is a screw formed to receive a screw nut x. This nut acts against the superior end of said spring so as to force the actuator down upon its cone u, sufficient to produce the amount of friction necessary to cause the actuator to be revolved by the shaft, t, and against the arm, p, except when the catch N, to be hereinafter described, may estop the revolution of the actuator. The said catch, N, formed and supported on a fulcrum, z, has its hooked end resting against the periphery of the cam, v, while its other end is borne against the periphery of one of the knife edge feed rollers by a spring, y. The shafts, C, C, of the said two knife edge feed rollers, F, F, pass respectively through two bent or right angular levers, O, P, whose fulcrum, a', b', extend from the slider, I. The said levers are arranged on the slider as shown in Fig. 6, and they are connected with a long lever, R, by means of links, S, S, jointed to them and to such lever. The fulcrum, c', of the lever R, is placed midway between the links, S, S, and is carried by the slider, I. The longer arm of the said lever, R, plays on a screw rod, d', and rests against a spring, e', placed on the rod and so as to bear against a stud, f', that projects from the slider and carries the said screw rod. A screw nut, g', is screwed on the screw rod and against the said longer arm of the lever, R. By screwing up the nut, the two feed rollers, F, F, may be forced apart from one another, and thus, while the spring serves to cause the said feed rollers to bind closely on a strip of ratan while running between them, the nut will enable their distance apart to be regulated.

An endless band, U, working around the cone drum, L, and a pulley, V, carried by the shaft, C, of one of the feed rollers, G, G, serves to put such cone drum in rotation. By means of another endless band, W, working around the two cone drums and through the groove of a slide, X, carried by one of the shafts of the rollers, G, G, rotary motion will be imparted to the drum, M, and of course to the actuator cam and its fellow or stopping cam.

The slider, I, and its adjustable arm, p, and the actuator cam afford a means of moving the feed rollers, F, F, laterally relatively to the knife, H, while a strip of ratan is being run through the machine or between the several sets of feed rollers. Such slider arm and actuator cam may be termed the " lateral motion mechanism."

By means of the cone drums, the speed of rotary motion of the actuator may be regulated so as to cause the lateral movement of the feed rollers, F, F, during the entire passage of the strip of ratan through the machine to be to the extent and in the manner required to cause the ratan to be split diagonally from end to end.

As the ratan enters between the two feed rollers, F, F, it will force them asunder and at the same time crowd one of them against the tail of the lever catch, N, so as to move such catch on its fulcrum and away from the stop, x', of the cam, v. This will release the actuator and allow it to be revolved by the shaft, t.

From the above, it will be seen that the stop cam, v, the lever catch, N, and its spring constitute a mechanism for not only stopping the operation of the lateral motion mechanism, immediately after a strip of ratan may have been split, but for holding the actuating cam in its proper position for the splitting and lateral motion machinery to commence action upon another strip of ratan. As the actuator and its stop cam rest on the cone of the shaft, t, it will be seen that when the catch, N, prevents the actuator from revolving, the shaft, t, can continue to revolve with its cone drum.

The purpose of the adjustable arm, P, and its means of adjustment, is to enable the bite of the knife edge feed rollers F F to be properly adjusted relatively to the knife and the actuator in order that the knife may commence to cut a ratan nearer to the circumference of one end than to the center of such end.

Instead of applying the feed rollers to the slider I, as described, such slider may be made to carry the knife so as to move it laterally relatively to the feed rollers whose axes under such circumstances may be stationary while the ratan is being split, or movable only to conform to the irregularities or inequalities of the ratan and so as to advance it relatively to the knife. I mention this change of construction as an equivalent for one part of my invention and to prevent others from infringing on my machine or invention by adopting such equivalent.

Having described my ratan splitting machine what I claim therein as of my invention is as follows:

1. In combination with the splitting knife and the feeding mechanism, a mechanism for moving the feed rollers, F, F, laterally relatively to the knife, such mechanism for so moving the feed rollers consisting of the actuator cam $s$, and the slider, I, furnished with an adjustable arm, $p$, the whole operating and being operated substantially as specified.

2. In combination therewith, a mechanism consisting of the stop cam, V, the lever catch, N, and its spring, $y$, or mechanical equivalents therefor not only for stopping the operations of the lateral motion machinery immediately after the splitting of a ratan may have been accomplished, but for stopping and holding the actuator cam of such lateral motion mechanism in its proper position for the feeding and splitting machinery to commence action on another ratan.

3. Applying the actuator cam and its stopping cam or either to the shaft, $t$, substantially as described so as to be capable of revolving thereon and providing the same with devices for producing friction so as to cause the shaft to revolve the cam, when the latter is not held or estopped by the lever catch and stop cam as described such devices consisting of the cone, $u$, and the spring, $w$, or mechanical equivalents therefor.

4. Combining with the slider, I, of the lateral motion mechanism, an arm $p$, and its adjustable devices arranged to operate substantially in manner and for the purpose as stated.

5. The combination of levers, O, P, R, and the spring $e'$, arranged, applied together and to the slider, I, and the shafts of the feed rollers F, F, substantially as and to operate as stated.

6. The arrangement of the strip guides, $m$, and $n$, relatively to the knife and the set of draft rollers, G, G.

LIVERAS HULL.

Witnesses:
R. H. EDDY,
F. P. HALE, Jr.